US008266346B2

(12) United States Patent
Klosters et al.

(10) Patent No.: US 8,266,346 B2
(45) Date of Patent: Sep. 11, 2012

(54) DATA PROCESSING APPARATUS THAT PROCESSES INCOMING BITS

(75) Inventors: Franciscus Johannes Klosters, Nijmegen (NL); Patrick Willem Hubert Heuts, Nijmegen (NL); Joris Rudolf Beverloo, Nijmegen (NL); Hendrik Bernard Heule, Nijmegen (NL)

(73) Assignee: NXP B.V., Eindhoven (NL)

( * ) Notice: Subject to any disclaimer, the term of this patent is extended or adjusted under 35 U.S.C. 154(b) by 1778 days.

(21) Appl. No.: 10/531,399

(22) PCT Filed: Sep. 19, 2003

(86) PCT No.: PCT/IB03/04196
§ 371 (c)(1),
(2), (4) Date: Apr. 14, 2005

(87) PCT Pub. No.: WO2004/036820
PCT Pub. Date: Apr. 29, 2004

(65) Prior Publication Data
US 2006/0095618 A1 May 4, 2006

(30) Foreign Application Priority Data
Oct. 18, 2002 (EP) .................................. 02079338

(51) Int. Cl.
*G06F 3/00* (2006.01)

(52) U.S. Cl. ......................................................... 710/58
(58) Field of Classification Search ................... 710/58; 712/225
See application file for complete search history.

(56) References Cited

U.S. PATENT DOCUMENTS

| 4,975,828 | A | * | 12/1990 | Wishneusky et al. ........... 710/11 |
| 6,157,689 | A | | 12/2000 | Petty et al. |
| 6,163,586 | A | * | 12/2000 | Hongbin Hao et al. ........ 375/377 |
| 6,167,466 | A | * | 12/2000 | Nguyen et al. .................. 710/30 |
| 6,594,529 | B1 | | 7/2003 | Boggs et al. |
| 2002/0087781 | A1 | | 7/2002 | Matsubara et al. |

FOREIGN PATENT DOCUMENTS

WO 99/60760 A1 11/1999

* cited by examiner

*Primary Examiner* — Jacob A Petranek

(57) ABSTRACT

A data processing apparatus receives a communication signal that contains temporally successive bits. A programmable processor circuit executes a plurality of series of programmed instructions for operations such as parity checking, each at a time of reception of a respective one of the bits. The processor circuit suspends operation each time after executing a respective one of the series of instructions. A synchronization circuit triggers execution of respective ones of the series, each time at the time of reception of the respective one of the bits, and, except for a last one of the series, prior to reception of one or more later bits that contribute to the data word.

9 Claims, 4 Drawing Sheets

DATA PROCESSING APPARATUS THAT PROCESSES INCOMING BITS

Figure 1:
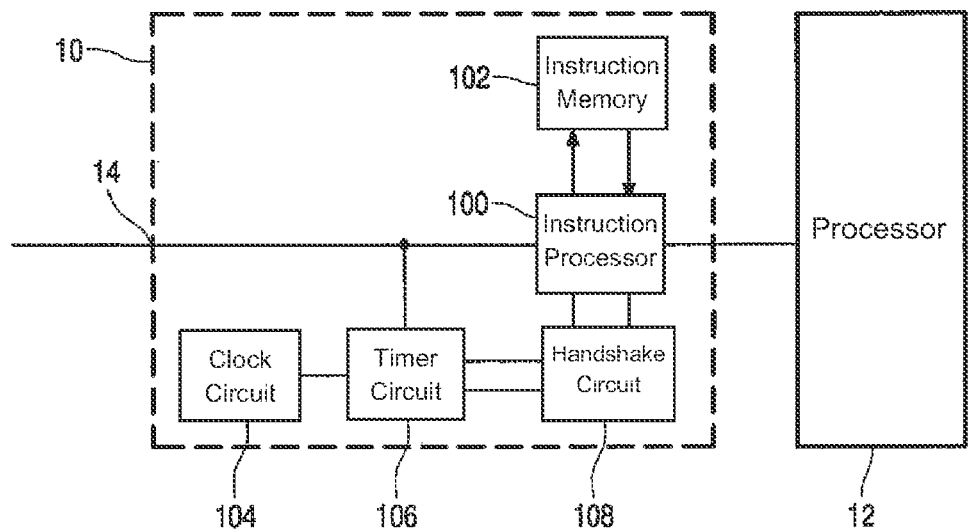

The invention relates to a data processing apparatus with an input port for receiving a communication signal.

In data processing equipment, data serial bit streams are often used to communicate data between different apparatuses. Successively received bits are formed into data messages. During reception, sampling of the different bits from the stream is usually performed under control of a clock signal. A clock signal with a predetermined fixed frequency is often used for this purpose, but selection between alternative frequencies is also known. From PCT patent application No. WO9960760 for example, a clock circuit is known that adapts the divisor with which the sampling clock signal is obtained from a master clock to measured characteristics of the communication signal.

In addition to reception of the bits and conversion to data words, various forms of processing may be applied to the bits. For example, it may be necessary to compute one or more parity values. Dedicated circuitry may be provided for this purpose, which performs such computations cumulatively, updating cumulative results (such as intermediate parity computation results) each time when a new bit has been received. Typically such dedicated circuits produce these results in a single action, i.e. without requiring a plurality of clock cycles.

Alternatively, a programmable processor may be used for this purpose, which is advantageous when changes to processing functions have to be contemplated, for example dependent on the application of the apparatus. Usually, in this case, the complete data word is processed to determine parity values. When a programmable processor is used for this purpose, one often uses a micro-controller which also performs further processing of the data words themselves, that is, not just cumulative bit processing. However, this means that a relatively heavy processor is needed. As a further alternative, one might use different processors for cumulative processing and further processing, respectively, but this may still require relatively complex processing circuitry in comparison with hardwired solutions. In addition, the use of multiple processors increases power consumption.

Amongst others, it is an object of the invention to reduce the processor complexity when a programmable processing circuit is used to perform cumulative computations using bits received from an incoming communication stream.

Amongst others, it is a further object of the invention to reduce power consumption in an apparatus in which a programmable processing circuit is used to perform cumulative computations using bits received from an incoming communication stream.

The apparatus according to the invention is set forth in claim 1. According to the invention processing circuitry is used to perform processing in support of reception and/or outputting the incoming bits in small bursts of programmable instruction processing during reception of the incoming bits. Between the bursts, operation of the processing circuitry is suspended. The processing in support of reception does not, in principle, affect the transfer of received information from the input to the output, but concerns ancillary processing, such as the computation of parity bits, error detection, error signaling or error correction. By using the invention, computations for such ancillary processing are spread over the time interval during which the bits that contribute to the data word are received, which makes it possible to produce the result of the computations relatively quickly after all bits of the data words have been received, using less complex processing circuitry than would be needed to realize the same result after all of the bits have been received. By suspending processing after all of the instructions for processing one of the bits have been performed, that is, until the next series of instructions is started, power consumption is reduced. Preferably, cumulative information is computed by executing a plurality of series of instructions. Each series adds a contribution to the cumulative information for a respective one of the bits. Execution of each series is triggered at the time of reception of the bit and after execution of the series has been completed processing is suspended.

In an embodiment, the processing circuitry is asynchronous, using handshaking to sequence execution of successive instructions from each series, execution of the first instruction from each series being triggered by a timing signal that indicates reception of a next input bit. This makes it possible to minimize power consumption by the processing circuitry.

In a further embodiment, an adaptable timing circuit is used to trigger execution of the respective series. The timing circuit measures some characteristic of the input signal and adapts the frequency with which execution of the series of instructions is started. It should be noted that this frequency does not need to be linked to the duration of instruction cycles in which individual instructions of the series are executed. By adapting the frequency it is made possible that a minimum frequency can be used that is necessary for the operation of the apparatus, which also minimizes power consumption. Preferably, the frequency is set once for an entire data word using some synchronization interval. Thus a simple adjustment can be realized, which is not dependent on the value of the bits in the data word. Even more preferably, a validation part of the input signal is used to condition triggering of execution of the series. This reduces power consumption even further, because no execution is performed when no valid data is received.

These and other objects and advantageous aspects of the invention will be described using the following figures.

Figure 3:
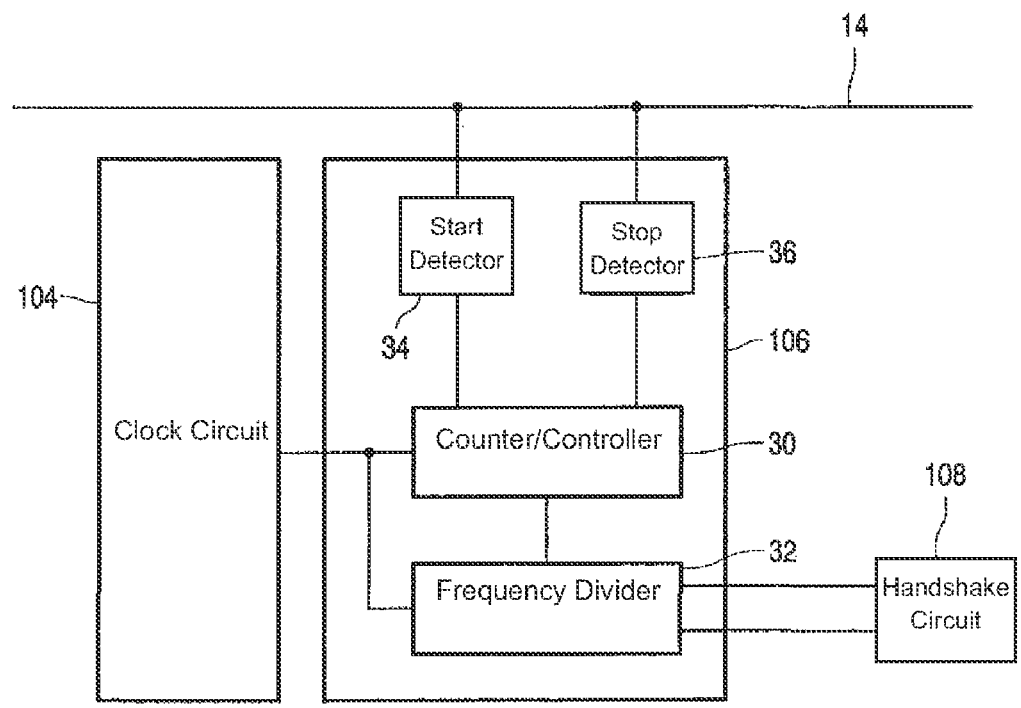
Figure 2:
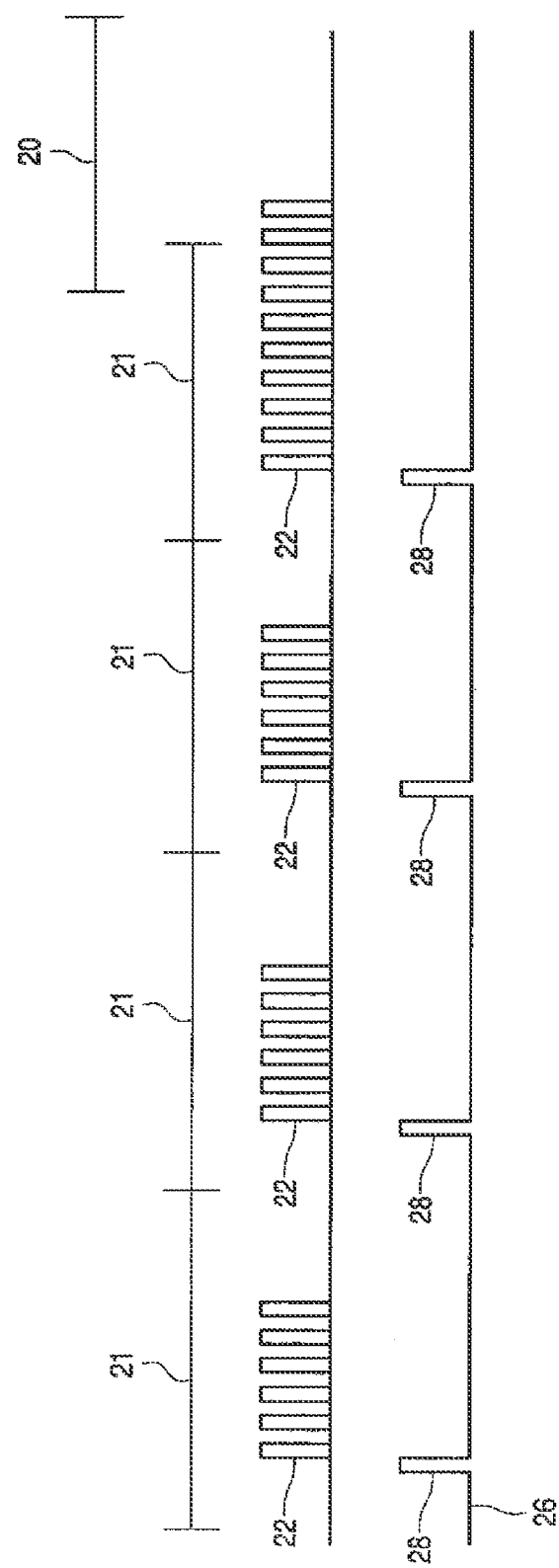
Figure 4:
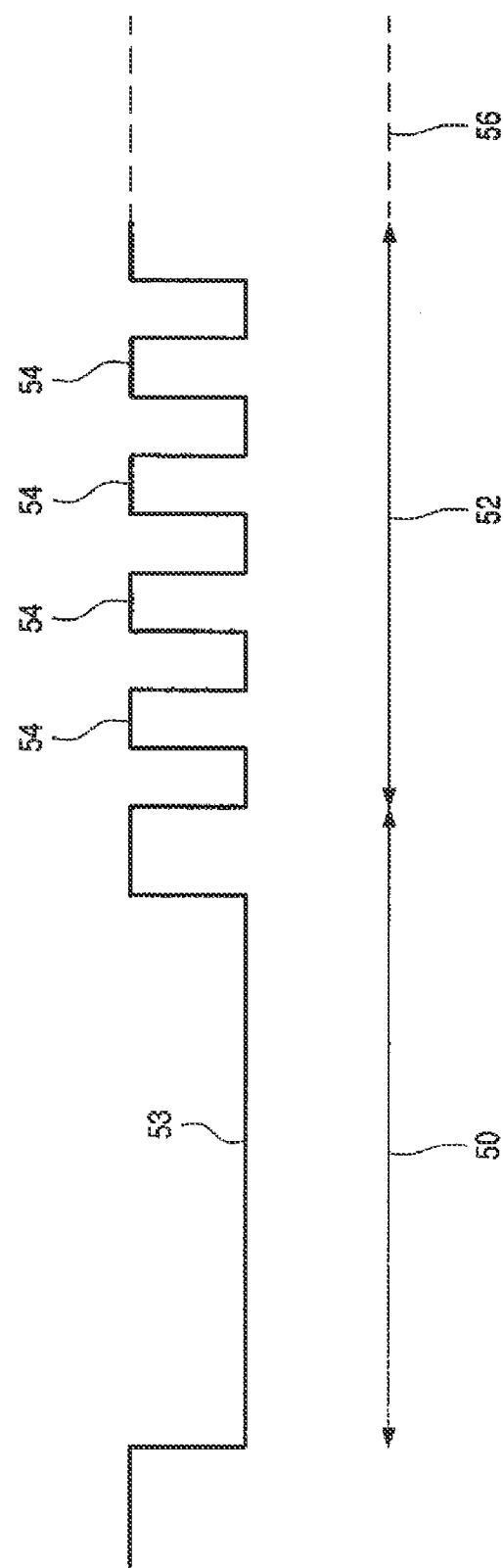
Figure 5:
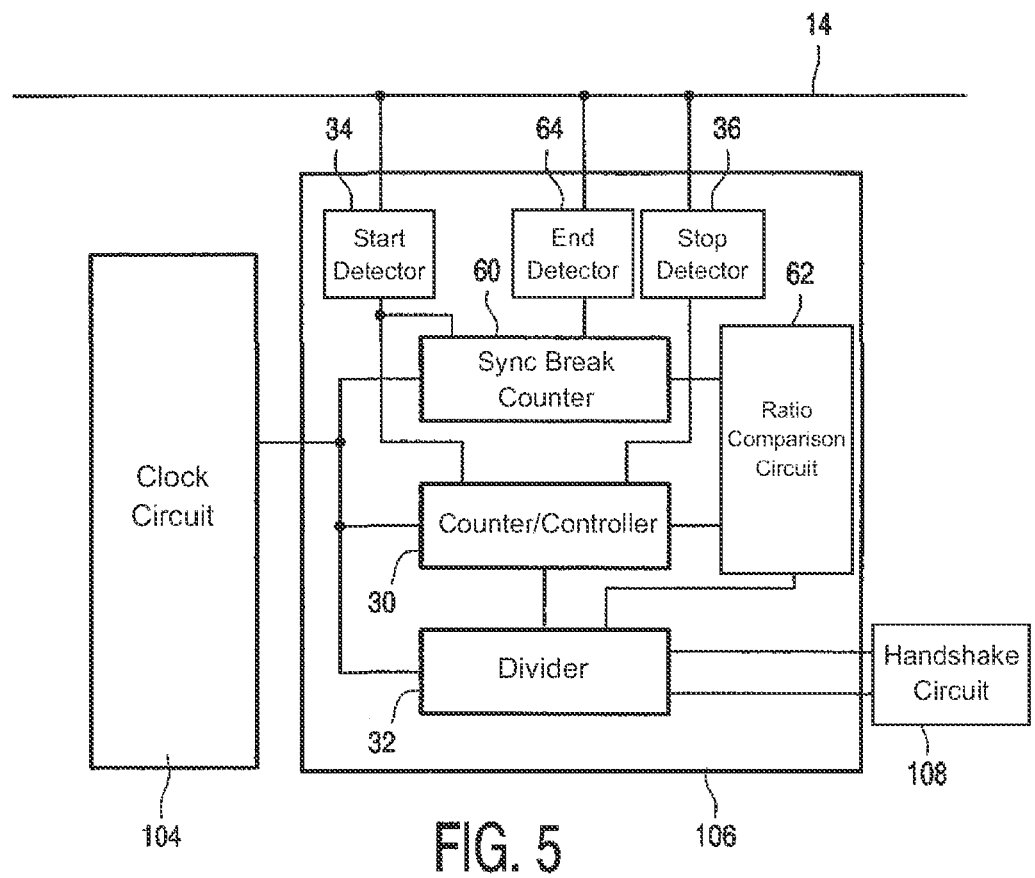
Figure 6:
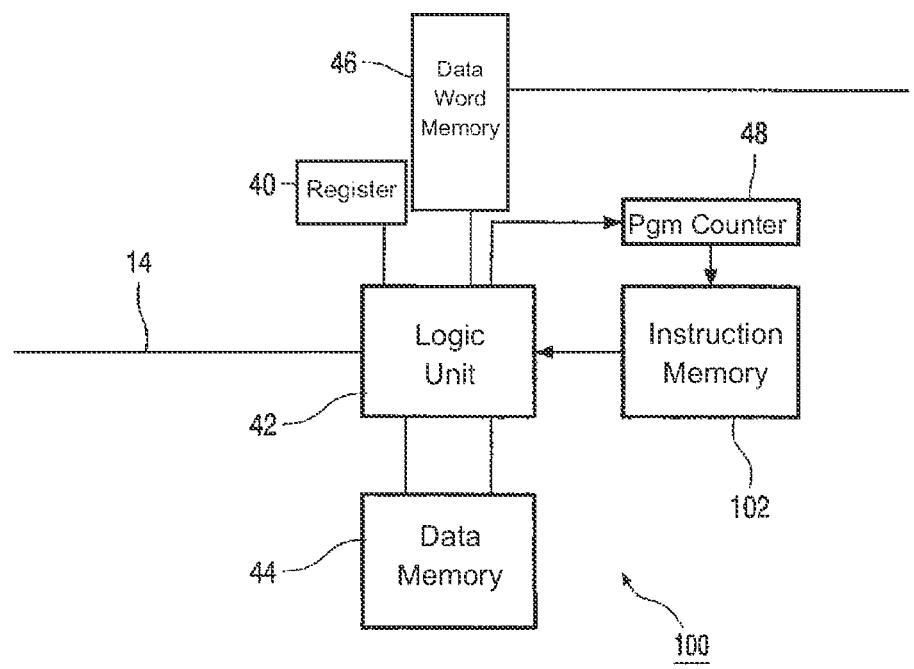

FIG. 1 shows a data processing apparatus.
FIG. 2 shows bursts of instruction execution
FIG. 3 shows a timer circuit
FIG. 4 shows a synchronization part of an input signal
FIG. 5 shows a further timer circuit
FIG. 6 shows a processor circuit FIG. 1 shows a data processing apparatus with an input processor 10 and a further processor 12. Input processor 10 contains an instruction processor 100, an instruction memory 102, a clock circuit 104, a timer circuit 106 and a handshake circuit 108. A communication input 14 of the data processing apparatus is coupled to instruction processor 100 and timer circuit 106. Clock circuit 104 is coupled to timer circuit 106, which in turn is coupled to instruction processor 100 via handshake circuit 108. Instruction processor 100 is coupled to instruction memory 102, handshake circuit 108 and further processor 12.

FIG. 2 shows a trigger signal 26 with pulses 28, bursts 22 of instruction cycles and bit periods 21 and a data word cycle 20 as a function of time. Although FIG. 2 only shows a groups of bit periods 21 for the bits in a single data word, it should be understood that messages may contain a succession of such groups, each for a successive data word, and each with their own data word cycle 20.

In operation, a signal that represents temporally successive bits in different bit periods 21 is applied to input 14. Timer circuit 106 generates trigger pulses 28 each time at points in time when the bits are available at input 14. Timing of the trigger pulses 28 is critical only in so far as the trigger pulses 28 are each generated somewhere within the period in which the corresponding bit is known to be stable on input 14.

Furthermore the pulses should have sufficient distance between one another to permit completion of each burst 22 before the next trigger pulse 28. A reception latch may be provided to latch the input bits; in this case the trigger pulses may even be generated outside the periods in which the bits are stable.

In response to the trigger pulses 28, instruction processor 100 fetches a series of instructions from instruction memory 102 and executes each series of instructions in a respective burst 22 of instruction cycles. After a number of such bursts 22, all bits of a data word have arrived at input 14 and have been processed by instruction processor 100. In the last one of said bursts 22, instruction processor 100 outputs the data word to further processor 12 in data word cycle 20. This may be done by outputting all received bits in parallel, or bit serially, in which any clock signal may be used to clock successive bits of the bits.

Dependent on the requirements of the context various types of processing may be performed during the bursts 22. In one example a plurality of parity bits is potentially updated in each burst 22, by successively executing respective instructions to update various parity values in each burst 22, dependent on the value of a received bit and formulas for the different parity bits (the formulas determine how, if at all, a bit at a certain position in a data word contributes to respective parity bits; typically Exclusive Or functions of previous value of respective parity bits and the received bit are computed if the formula for the particular parity bit indicates that the particular received bit contributes to the particular parity bit). A typical series of instructions is

| | |
|---|---|
| f = inp RXD | Read Input Bit into register f |
| m1 = f | Store input bit in location m1 |
| m2 = f + m2 | Update first parity bit in location m2 |
| m3 = f + m3 | Update second parity bit in location m3 |
| wait | Suspend operation until next bit |

(dependent on the sequence number of the bit in the data word different parity bits may be updated or the parity bits in locations m2, m3 may not be updated). When all instructions of a burst 22 have been processed, instruction processing is suspended until the next burst 22 is triggered. Preferably no or substantially no internal signal transitions occur in instruction processor 100 during suspension so as to minimize power consumption. When all input bits have been processed the parity bits may be output to further processor 12, or they may be used by instruction processor 100 to correct signal errors.

Handshaking is used to control the operation of instruction processor 100. Initially timer circuit 106 generates a request signal (typically by raising trigger signal 26). In response to the request signal, instruction processor 100 starts processing a first of a series of instructions in a burst 22. Instruction processor 100 sends an acknowledge signal back to timer circuit 106 which deasserts the request signal in response thereto (typically by lowering the trigger signal 26). Once instruction processor 100 has indicated that it is ready to receive a next request signal, timer circuit 106 may generate a new request signal, but it will do so generally with a delay at a time when a new input bit is available. Subsequent to the trigger signal from timer circuit 106, instruction processor 100 generates a series of request signals for itself to trigger execution of subsequent instructions of the series in burst 22. This repeats until the series of instructions has finished (as indicated by the "wait" instruction in the programming example), whereupon no further request signals are generated by instruction processor 100.

Internally in instruction processor 100, in principle, the handshakes may be passed on so that any sub-circuit that gets involved in instruction execution is activated by handshakes and in turn activates further involved sub-circuits with handshakes. Thus, power consumption is reduced since no sub-circuit needs to produce signal transitions unless this is necessary for execution of a particular instruction. Of course, the invention is not limited to handshaking to ensure suspension of operation. For example, a clocked instruction processor may be used in combination with some form of clock gating, which ensures that no clock signals are applied to instruction processor 100 outside bursts 22. This also reduces power consumption, be it less than with handshaking.

Although the invention has been described in terms of reception of bits by instruction processor 100, it will be understood that, without deviating from the invention instruction processor 100 may also be arranged to transmit data back via communication input 14 in any or all of bit periods 21. For example, instruction processor 100 may return an acknowledgement in a bit period 21, or it may transmit data in a plurality of bit periods 21 once it has identified from information in preceding bit periods 21 that it is required to do so.

FIG. 3 shows an example of an embodiment of timer circuit 106. This embodiment contains a counter/controller 30, a frequency divider 32, a sync field start detector 34 and a sync field stop detector 36. Sync field start detector 34 and sync field stop detector 36 are coupled to input 14 and have outputs coupled to counter/controller 30. Counter/controller 30 has an input coupled to clock circuit 104 and an output coupled to divider 32. Divider 32 has inputs coupled to clock circuit 104 and counter/controller 30 and an output coupled to handshake circuit 108.

FIG. 4 shows an example of a synchronization part of an input signal from input 14. This synchronization part corresponds to the synchronization part of the LIN protocol, which is publicly known per se. This synchronization part precedes bit periods 21 of FIG. 2. The synchronization part contains a sync break interval 50 and a sync field interval 52. In sync break interval 50 the input signal assumes a low level 53 for a first time interval, after which the signal rises to a high level. The length of sync break interval 50 has been chosen so that it is longer than the length of low levels that can be caused by any bit pattern elsewhere in the message (longer than a byte full of zeros). In sync field interval 52 the input signal contains four pulses 54, in which the input signal first assumes a low level and then a high level. Sync field 52 is followed by a subsequent message interval in which bit periods 21 (not shown) occur. The duration of the bit periods has a predetermined ratio to the duration of sync field interval 52.

In operation the input signal is generated by a transmitter (not shown) and processed by timer circuit 106. Sync field start detector 34 detects the start of sync field interval 52 in the input signal from input 14. Sync field start detector 34 signals counter/controller 30 to reset a count and start counting clock pulses from clock circuit 104 in response to detection. Sync field stop detector 36 detects the end of sync field interval 52 and signals counter/controller 30 to stop counting. Thereupon counter/controller 30 applies a divisor value determined from the counted number of clock pulses to divider 32, which divides the clock frequency by the divisor value. Divider 32 applies clock pulses at the divided frequency to handshake circuit 108 to start bursts 22.

In divider 32 a counter circuit (not shown) may be used which generates a pulse each time when it has counted a set number of clock pulses from clock circuit 104. In this case the set number corresponds to the number of pulses counted by counter/controller divided by a predetermined factor representing the number of bit periods of the sync field. But the invention is not limited to this type of divider 32.

When the sync field contains more than one bit period it is possible to determine the number of clock pulses of clock circuit 106 with a fractional error less than plus or minus one clock pulse. For example when eight bit periods occur in a sync field, the length of the bit period can be determined to within $\frac{1}{8}^{th}$ of a clock period. When divider 30 uses a simple counter, the fractional accuracy is discarded. In a further embodiment, this fractional accuracy is exploited by using a digital oscillator that allows the number of clock periods of clock circuit 106 per bit period to vary so that on average the duration of the bit period more closely corresponds to the bit period that has been measured with fractional accuracy.

Such a digital oscillator may be implemented for example as an adder circuit that adds an increment to a count value in each clock period of clock circuit 104 and generates a pulse indicating a bit period each time when the count value exceeds a threshold, at the same time lowering the count by the threshold. In this case the threshold and/or the increment may be set corresponding to a count from counter controller 30, so that the average number of clock periods of clock circuit 104 per bit period equals the fractionally accurate duration of the bit period determined from the sync field by counter controller 30. As a result the number of clock pulses per bit period may vary so that on average the length of the bit period equals the required fractionally accurate bit period.

Clock circuit 106 is preferably designed so that the frequency of the clock pulses from clock circuit 106 is sufficiently high, so that errors in the frequency of the trigger signal pulses 28 are so small that no error occurs during sampling of bits from the input signal. Typically, the errors include timing errors due to an unpredictable relative timing of transitions in the clock signal from clock circuit 106 and transitions in the input signal. The maximum cumulative effect of these errors is an error that is a predetermined number of times (e.g. 10) the duration of the clock period of the clock signal from clock circuit 106. Given a desired accuracy (of for example no more than 1.5% error at the end of a 9 bit data word transmitted with 20 kbit per second) a minimum allowable frequency of clock circuit 104 can be derived (for example 1.4 MHz in this case).

Thus, timer circuit 104 adapts the frequency of trigger pulses 28 to a measured characteristic of the input signal at input 14 to enable instruction processor to process incoming bits with a short burst 22 of instruction executions.

In addition, other characteristics of the input signal may be used to detect whether a data word is supplied, i.e. to determine whether trigger pulses should be generated at all. For this purpose detection of sync break interval 50 may be used, and/or detection of the correct number of pulses 54 with appropriate duration in sync field interval 52. The low signal level 53 in sync break interval 50 persists for a certain minimum duration. This minimum duration stands in a predetermined ratio to the duration of sync field interval 52. As well as for setting the divisor, timer circuit 106 may therefore be arranged to generate successive trigger pulses 28, as controlled by the sync interval, only after a corresponding sync break has been detected.

Timer circuit 106 is able to perform monitoring for sync breaks in parallel with normal processing of the message by input processor 10. Thus, continuous monitoring for sync breaks is possible. No sync breaks will be missed because input processor 10 is busy processing a message.

FIG. 5 shows an embodiment of a timer circuit which checks the duration of one or more of the intervals and pulses 54. In addition to the component of FIG. 3, the embodiment of FIG. 5 contains a sync break counter 60, a sync break end detector 64 and a ratio comparison circuit 62. Sync break counter 60 has a clock input coupled to clock circuit 104, a start input coupled to start detector 34 and a stop input coupled to an output of sync break end detector 64. Outputs of counter/controller 30 and sync break counter 60 are coupled to ratio comparison circuit 62, which has a control output coupled to divider 32.

This embodiment addresses the problem that the minimum duration of the sync break interval 50 cannot be checked when the clock rate is not known with sufficient accuracy in advance. When only small variations in bit-rate are permitted it is possible to set a threshold duration for sync break interval 50 that is longer than the duration of a low level as a result of any normal data pattern even at the lowest possible clock rate, but shorter than the minimum duration of the Sync break for the highest possible clock rate. However, such a threshold duration cannot be found when too much variation in the clock rate can occur.

In the embodiment of FIG. 5, timer circuit 106 detects the presence of a sync break 50 a posteriori in combination with a clock rate measurement. Sync break counter 60 counts the number of clock pulses from clock circuit 104 in time intervals when the signal assumes low level 53, indicating that such an interval could be a sync break interval 50. Counter/controller 30 counts the number of clock pulses during sync field interval 52. The counts from sync break counter 60 and counter/controller 30 are applied to ratio comparison circuit 62 which tests whether ratios between successively determined counts from sync break counter 60 and counter/controller 30 are within a predetermined range that corresponds to a specified minimum duration of synch break interval 50, allowing for sampling errors and clock rate fluctuations. Only if ratio comparison circuit 62 detects such a combination, it signals divider 32 to take over the divisor determined by counter/controller 30.

Ratio comparison circuit 62 can implement the comparison for example by multiplying both counts from a combination by appropriate factors, followed by a comparison of the products. Preferably ratio comparison circuit 62 makes use of pipelining, that is, it has storage elements for storing a number of successively determined counts from sync break counter 60 and compares the oldest count (corresponding to a low signal interval that precedes the end of sync field 52 by a predetermined number of low signal intervals as shown in FIG. 4) with the count from counter/controller 30. Thus, a sync break can be detected using more recent counts from sync break counter 60 if detection fails. However, such pipelined storage is not needed, for example, when very short intervals (such as the intervals between pulses 54) can be eliminated as sync break intervals 50 a priori on the basis of a minimum duration threshold, so that counts for these intervals need not be stored.

As well as for setting the divisor, timer circuit 106 in this embodiment may be arranged to generate successive trigger pulses 28, as controlled by the sync interval, only after a corresponding sync break has been detected.

Although a separate sync break counter 60 and counter/controller 30 have been shown, it will be understood that the same counter might be used for both forms of counting, provided that storage is provided for storing counts of clock pulses of the different time intervals concerned and for combining these counts to detect the ratio between sync break interval 50 and sync field interval 52.

Also timer circuit 106 may be constructed to conduct further checks on the input signal and to make generation of the trigger pulses 28 conditional on a positive result of such a test.

Thus, for example timer circuit 106 may check for the presence of sufficient signal level changes due to pulses 54 with the appropriate relative timing in sync field interval 52. If such level changes are absent, detection of the sync break is suppressed, the divisor is not updated and no message is received.

Of course, many alternative embodiments of timer circuit 106 exist. For example, when the length of bit periods 21 is highly predictable, fixed timing of the trigger pulses may be used. Also other characteristics of the incoming signal may be used to adjust the timing, for example a phase-locked loop might be used to synchronize the clock signal to the communication signal. By permitting adaptation of the frequency of the trigger pulses to the incoming signal it is made possible to adapt transmission speed to the amount of data that needs to be communicated, so that power consumption by instruction processor 100 can be minimized.

FIG. 6 shows an embodiment of a one bit wide processor that may be used as instruction processor 100. The instruction processor 100 contains a logic unit 42, a one bit register 40, a data memory 44, a program counter 48 and a data word memory 46. Logic unit 42 is coupled to input 14, one bit register 40, data memory 44, program counter 48 and data word memory 46. Without deviating from the invention, more than one bit register 40 may be provided. Program counter 48 has an output coupled to an address input of instruction memory 102, which in turn has an instruction output coupled to logic unit 42. Data word memory 46 is coupled to further processor 12 (not shown). Data memory 44 may be of any type. In one example a cyclic shift register may be used as a data memory, which shifts the addresses of stored bits by one step each time when a data bit is stored, or in each clock cycle. In this case it may not be necessary to address data memory 44; instead data from a predetermined address may be used. The appropriate data can be accessed by using the appropriate cycle in which the required data is located in the predetermined address.

In operation, instruction processor 100 executes a series of instructions that use one bit operands from register 40, from input 14 and/or from data memory 44 and outputs bits to data word memory 46 (from which data words are supplied to further processor 12). The content of program counter 48 addresses the instructions that must be executed and is normally incremented after each instruction to address a next instruction. Instruction memory 102 supplies the addressed instruction to logic unit 42. Instructions that logic unit 42 is capable of executing include instructions to load one bit data into register 40 from various sources, store instructions to one bit store data, logic instructions, such as And, OR and Exclusive Or instructions with one bit operands from various sources and branch instructions, which may be conditional, to change the content of program counter 48 by an amount specified in the branch instruction.

The instructions that are supplied from instruction memory 102 during operation in a burst 22 include an instruction to read an input bit from input 14 and an instruction to output bit to data word memory 46. Once all input bits for a data word have arrived and have been output to data word memory 46, data word memory 46 supplies the data word to further processor 12 (not shown). Computed parity bits may be added to the data word. In principle all bits of the data word may be supplied from data word memory 46 to further processor 12 in parallel, but of course serial transport may be used as an alternative.

A one bit wide operand processor has the advantage that it provides the flexibility of programming at the cost of relatively little circuitry. This comes at the cost of low processing power, making it necessary to execute a relatively large number of instructions to execute specific operations as compared to the number of instructions needed by multi-bit operand processors. However, because processing is spread over bursts 22, for each incoming bit only a relatively small number of instructions need executed at a time in each burst 22. Thus it is possible to process the incoming data programmably with a one bit operand processor.

Of course the invention is not limited to the use of the programmable one bit operand processor of FIG. 6. Other types of programmable one bit operand processors may be used, or even programmable multi-bit operand processors, although the latter will increase the complexity of the circuit.

The invention claimed is:

1. A data processing apparatus, the apparatus comprising:
    an input port for receiving a communication signal that contains temporally successive bits;
    an output port for outputting a data word formed from respective ones of the temporally successive bits;
    a programmable processor circuit coupled to the input port, the processor executing a plurality of series of programmed instructions in support of said receiving or said outputting, each at a time of reception of a respective one of the temporally successive bits, the processor circuit suspending operation each time after executing a respective one of the series of instructions;
    a synchronization circuit coupled to the processor circuit to trigger execution of respective ones of the series of instructions, each time at the time of reception of the respective one of the temporally successive bits, and, except for a last one of the series of instructions, prior to reception of one or more later bits that contribute to the data word.

2. A data processing apparatus according to claim 1, wherein the programmable processor is programmed to compute cumulative information, corresponding to a function of a combination of the bits from which the data word is formed, each series of instructions being programmed to add a contribution to the cumulative information of the respective one of the temporally successive bits at the time of reception of which the series is executed.

3. A data processing apparatus according to claim 2, wherein said cumulative information comprises one or more parity bits.

4. A data processing circuit according to claim 1, wherein the processor circuit is constructed sequence instruction execution using handshake signals, execution of each of the instructions of the series being triggered by a respective request signal, execution of each instruction of the series, except for a last instruction in each series, generating the request signal for a next one of the instructions in the series, the synchronization circuit being coupled to apply the request signals for the initial one of the instructions in the series.

5. A data processing apparatus according to claim 1, wherein the synchronization circuit contains an adaptable timer circuit, arranged to adapt a frequency of triggering the execution of the series of instructions under control of a timing of transitions in the communication signal.

6. A data processing apparatus according to claim 5, wherein the adaptable timer circuit is arranged to measure a duration of a synchronization interval in the communication signal preceding bits that contribute to the data word, and to set the frequency that will be used to trigger execution of the series of instructions dependent on the measured duration.

7. A data processing apparatus according to claim 6, wherein the timer circuit is arranged to detect presence or absence of a validation part in the communication signal prior to bits that contribute, to the data word, the timer circuit generating execution trigger signals only upon detection of the presence of the validation part.

8. A data processing apparatus according to claim 1, wherein the processor circuit is designed to execute only instructions with one bit operand data.

9. A method of processing data, the method comprising:
receiving a communication signal that contains temporally successive bits; outputting a data word derived from a plurality of the successive bits;
executing a plurality of series of programmed instructions in support of receiving and/or outputting, each at a time of reception of a respective one of the temporally successive bits, suspending execution of the series of instructions each time after executing a respective one of the series of instructions;
triggering execution of respective ones of the series of instructions, each time at the time of reception of the respective one of the temporally successive bits, and, except for a last one of the series of instructions, prior to reception of one or more later bits that contribute to the data word.

* * * * *